Aug. 9, 1927.   1,638,589
W. N. C. LOUW
STEAM ESCAPE DEVICE FOR COOKING UTENSILS AND THE LIKE
Filed Jan. 2, 1926
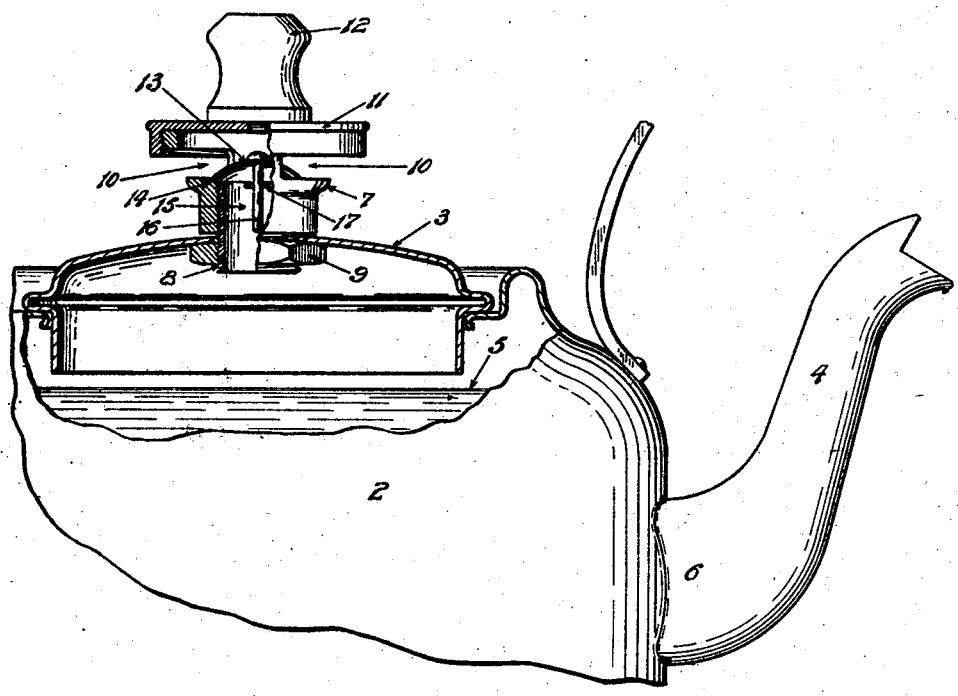
Inventor:
Wolsey Nelson Columbus Louw
By
Attorney.

Patented Aug. 9, 1927.

1,638,589

UNITED STATES PATENT OFFICE.

WOLSEY NELSON COLUMBUS LOUW, OF NEW MODDER, TRANSVAAL, SOUTH AFRICA.

STEAM-ESCAPE DEVICE FOR COOKING UTENSILS AND THE LIKE.

Application filed January 2, 1926, Serial No. 78,893, and in Union of South Africa July 31, 1925.

The present invention refers to means for permitting steam to escape from kettles, saucepans and the like in which liquids are boiled.

The invention is illustrated in the accompanying drawing which shows part of a kettle fitted with the invention.

2 indicates the body of the kettle and 3 the lid. 4 is the spout and 5 indicates the normal full water level, above the outlet 6 to the spout.

If the lid is loose, the steam evolved from the boiling water will lift, and escape past, the lid; and in so doing it often causes an unpleasant rattling of the lid. If the lid is too tight to lift, the steam tends to eject boiling water from the spout, which is inconvenient and often dangerous.

The object of the present invention is to avoid these difficulties by providing for the free escape of steam from the upper part of the utensil, while retaining the advantages of a closed cover for the vessel.

In the form illustrated the invention is shown as an attachment for existing utensils, which is fitted at any suitable point in the upper part of the utensil but preferably in the lid in place of the usual knob provided on the lid for lifting the same.

7 indicates a hollow casing having a hollow stem 8 which is conveniently a separate part screwed into the casing. The stem extends through a hole formed in the lid and is secured by a nut 9.

In the side of the casing are extensive openings 10 arranged to discharge the steam laterally. The upper part of the casing is closed, preferably by a removable cover 11 and is fitted with a knob 12 of heat insulating material. The upper part of the casing overhangs the apertures 10, thereby shielding the knob from the escaping steam.

It is preferred to provide the device with an outwardly opening non-return valve 13. In order that this may lift readily and remain lifted without rattling it is constructed as a thin aluminium shell of parti-spherical form concave downwards, providing a thin valve face 14 which closes onto an annular seating surface 15 in the base of the casing. The valve is guided by means of a central pin 16 working in a guide 17 which bridges the top of the stem piece 8. The cover 11 forms a stop to limit the lift of the valve.

Steam evolved from boiling water in the kettle passes up the hollow stem 8, lifts the valve 13 and flows laterally from the openings 10 without heating the knob 12 or scalding the hand of a person lifting the lid by means of the knob.

The overhanging upper part 11 of the casing at all times protects the apertures 10 from ingress of dust or smoke. Except when the water is boiling, the valve 13 remains closed, thereby sealing the interior of the utensil against the entrance of foreign matter and preserving therein a heated atmosphere which is conducive to rapid heating.

By making the device in separate parts as shown it can readily be taken apart for cleaning; while the removable cover 11 permits access to the valve.

I claim:—

1. A steam escape device for cooking utensils comprising a hollow casing having an opening for communicating with the interior of the utensil and having also lateral steam escape apertures; and a casing top overhanging said escape apertures, said top including a detachable cover, removal of which gives access to the interior of the casing.

2. A steam escape device for cooking utensils comprising a hollow casing providing a steam passage and lateral steam outlets; and an outwardly opening non-return valve in said passage adapted to be opened by inconsiderable steam pressure within the utensil, said casing having a top overhanging the outlets and comprising a detachable cover which retains the valve in position.

In testimony whereof I affix my signature.

WOLSEY NELSON COLUMBUS LOUW.